US008408855B2

(12) United States Patent
Stiebitz et al.

(10) Patent No.: US 8,408,855 B2
(45) Date of Patent: Apr. 2, 2013

(54) SCREW

(75) Inventors: Günter Stiebitz, Waldenburg (DE); Uwe Wolfarth, Schrozberg (DE)

(73) Assignees: SWG Schraubenwerk Gaisbach GmbH, Waldenburg (DE); Wuerth International AG, Chur (CH)

( * ) Notice: Subject to any disclaimer, the term of this patent is extended or adjusted under 35 U.S.C. 154(b) by 204 days.

(21) Appl. No.: 12/760,606

(22) Filed: Apr. 15, 2010

(65) Prior Publication Data

US 2011/0097178 A1    Apr. 28, 2011

Related U.S. Application Data

(63) Continuation of application No. 11/941,689, filed on Nov. 16, 2007, now Pat. No. 7,862,279.

(30) Foreign Application Priority Data

Nov. 22, 2006  (DE) .......................... 10 2006 057 259

(51) Int. Cl.
F16B 25/10 (2006.01)
F16B 35/04 (2006.01)

(52) U.S. Cl. ...................... 411/387.1; 411/411; 411/412

(58) Field of Classification Search .................. 411/411, 411/412, 413, 387.1, 387.2, 387.3, 387.4, 411/387.5, 387.6, 387.7, 387.8
See application file for complete search history.

(56) References Cited

U.S. PATENT DOCUMENTS 2,263,137 A    11/1941  Oestereicher
3,355,205 A *  11/1967  Wagner et al. .................. 403/11
3,665,801 A *  5/1972   Gutshall ..................... 411/387.7
4,572,720 A *  2/1986   Rockenfeller et al. ..... 411/387.1
4,645,396 A *  2/1987   McCauley et al. .......... 411/387.2
4,793,756 A * 12/1988   Baumgartner ............. 411/387.7
5,046,905 A *  9/1991   Piacenti et al. ............. 411/387.2
5,133,630 A    7/1992   Hughes
5,273,383 A    12/1993  Hughes
5,295,774 A *  3/1994   Roberts ..................... 411/387.2
5,358,366 A    10/1994  Suzuki
5,520,491 A    5/1996   Miyagawa
5,779,417 A *  7/1998   Barth et al. .................... 411/412
5,816,012 A * 10/1998   Willis ............................. 52/696
5,895,187 A *  4/1999   Kuo-Tai ....................... 411/386
6,328,516 B1  12/2001  Hettich
6,402,448 B1   6/2002   Dicke
6,789,991 B2 *  9/2004   Hsu ............................. 411/387.6
6,923,611 B2 *  8/2005   Kenny ............................. 411/411
7,402,016 B2   7/2008   Yin-Feng (Continued)

FOREIGN PATENT DOCUMENTS

DE    1752248    5/1957
DE    1085723    6/1958

(Continued)

*Primary Examiner* — Roberta Delisle
(74) *Attorney, Agent, or Firm* — Duane Morris LLP

(57) ABSTRACT

A screw, in particular a self-tapping screw, has a screw thread which covers up to the front end of the screw formed as a drilling tip or cutting tip. In the front area, starting with a distance from the front end of the screw, there is an opposite thread showing the same pitch as the screw thread, however, its thread height is lower than the thread height of the screw thread. This second, opposite single-thread, double-thread or triple-thread/multi-thread forms a cutting edge with its thread edge which is used to cut fibers in order to reduce wedge effect during screwing in the screw. The screw is particularly suitable for wood or wood-like materials in the edge areas of structural elements.

8 Claims, 1 Drawing Sheet

U.S. PATENT DOCUMENTS

| | | |
|---|---|---|
| 7,862,279 B2 * | 1/2011 | Stiebitz et al. ............. 411/387.1 |
| 2005/0069396 A1 | 3/2005 | Wu |

FOREIGN PATENT DOCUMENTS

| | | |
|---|---|---|
| DE | 1925732 | 5/1969 |
| DE | 29513571 | 8/1995 |
| DE | 19525732 | 1/1997 |
| EP | 0939235 | 2/1999 |
| GB | 2289317 | 11/1995 |
| JP | 06193621 | 7/1994 |

* cited by examiner

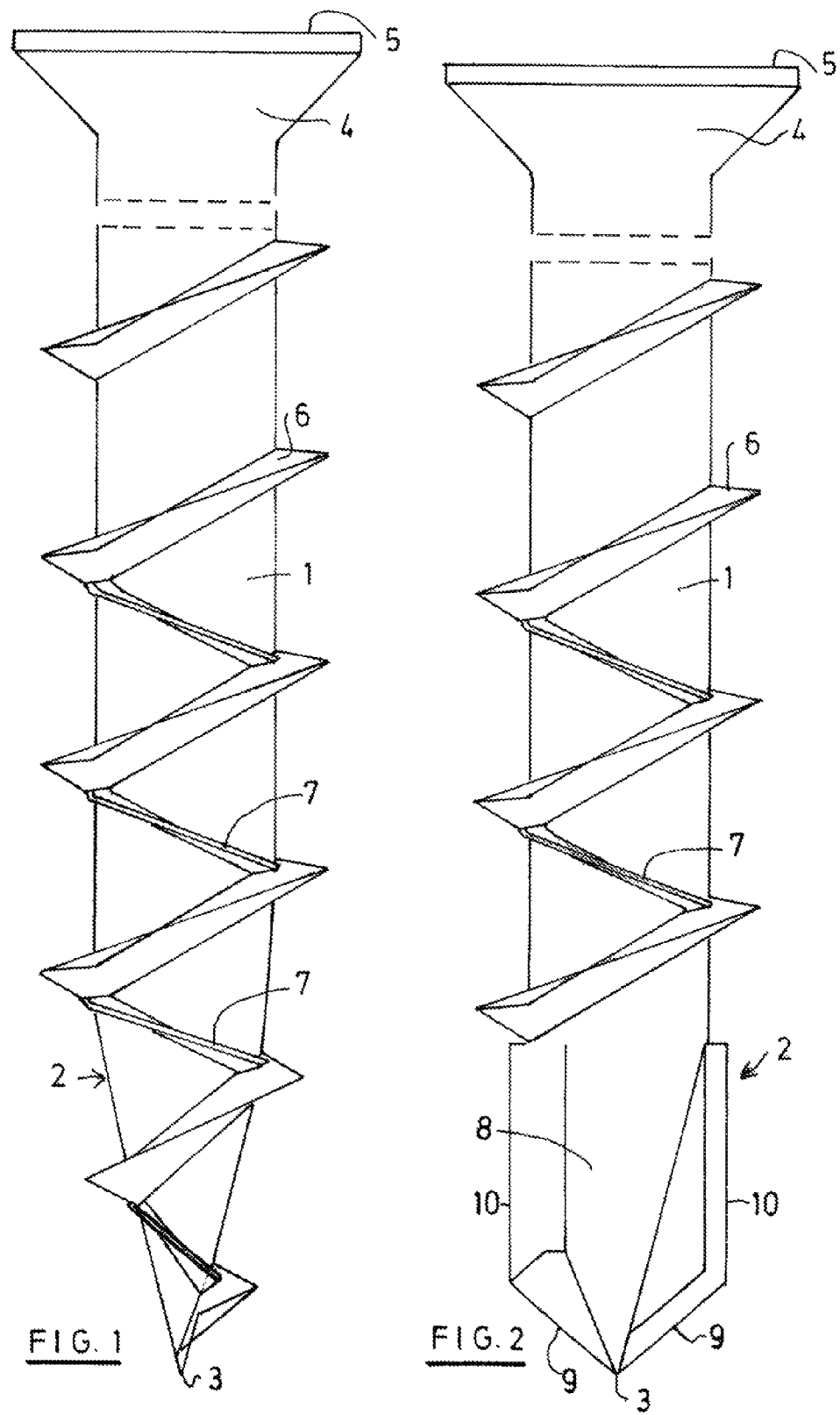

SCREW

CROSS REFERENCE TO RELATED APPLICATION

This application is a Continuation of application Ser. No. 11/941,689, filed Nov. 16, 2007 now U.S. Pat. No. 7,862,279 and claims priority under the Paris Convention of application DE 10 2006 057 259.9, filed Nov. 22, 2006 in Germany.

BACKGROUND OF THE INVENTION

1. Field of the Invention

The present invention concerns a screw, in particular a self-tapping screw.

2. Description of Related Art

It is known that serrations which usually run in the longitudinal direction i.e. crosswise to the movement of the screw tip as compared with the wood are arranged on the tip of the screw to make threading screws into wood or wood-like material easier. These serrations are also intended to reduce the risk of splits or splintering.

In a known screw of this type (DE 19525732), the serrations for a conical screw tip are in one forming the cone, in other words they run in a longitudinal centre plane contained in the longitudinal axis of the screw.

A screw (EP 939235 A) is also known where several serrations are diagonally arranged and in fact at an inclination angle compared to the longitudinal axis in a range of approximately 15°.

SUMMARY OF THE INVENTION

The underlying task of the present invention is to create a screw, in particular a self-tapping screw, with improved threading characteristics in particular with regard to the splitting of wood.

The present invention proposes a screw for completing this task. Advantageous embodiments of the present invention are described in the subclaims.

The opposite pitch thread which only covers a part of the thread forms a particularly advantageous possibility while making the hole which the screw is then threaded into to prevent a split effect so that the screw can also be used in the edge area of wood without the risk that the fiber of the wood there splits open and thus that the screw can no longer be thoroughly tightened.

It has emerged to be particularly expedient to form the cutting thread so that it covers two to three windings so that in this manner a continuous cutting edge interrupted if necessary by the screw thread is also produced for two to three turns for the cutting thread.

In an embodiment of the present invention, the thread height of the cutting thread can be selected so that it is between 0.2 mm and maximum the thread height of the screw thread.

It is an aspect of the invention that the cutting edge does not start directly at the front pointed end of the screw tip. It is thus ensured that initially the screw thread up to the front end engages in the wood in order to produce the advance.

It can be envisaged according to the present invention that the thread height of the cutting thread remains constant from its front area assigned to the screw tip to its end. This particularly applies if the thread height of the cutting thread is less than the thread height of the screw thread.

It is, however, also possible and within the scope of the present invention that the thread height of the cutting thread reduces from its beginning assigned to the screw thread up to the opposite end, for example tapers continuously.

An embodiment according to the invention can be envisaged where the pitch of the cutting thread is less than or equal to the thread pitch of the screw thread.

It has proven to be particularly expedient to make the thread pitch of the cutting thread the same as the thread pitch of the screw thread.

The screw thread can be a chipboard thread or a wood thread. It can be single-thread or multiple-thread. Accordingly, the cutting thread can also be single-thread or multiple-thread.

The tip of the screw can be both a drill bit (drill tip) as well as a conical form of the tip of the screw with screw thread up to the tip. The present invention is, however, also applicable for a screw which shows a cutting tip at its front end, in particular a pinched cutting tip with cutting edges.

While the cutting thread for a drill tip already starts within the conical area, for example at half the length of the conical area, the cutting thread for a cutting tip does not start until after the cutting tip.

The screw proposed by the present invention is suitable not only for wood or wood-like material but also for use as a sheet-metal tapping screw. Further characteristics, details and advantages of the present invention arise from the Claims and the Summary where the wording of both makes reference to the content of the Description, the following description of preferred embodiments of the present invention and using the drawings.

BRIEF DESCRIPTION OF THE DRAWINGS

FIG. 1 is a side view of a first embodiment of a screw with a drill tip, according to the present invention;

FIG. 2 is a side view of a second embodiment of the present invention with a cutting tip.

DETAILED DESCRIPTION

The screw shown in FIG. 1 and in FIG. 2 has a cylindrical screw shaft 1 which goes into a screw tip 2 at its bottom end in FIG. 1. In the embodiment shown in FIG. 1, the screw tip 2 shows a conical form drill tip with a sharp tip 3. The taper angle is approximately 30°. There is a screw head 4 at the opposite end, a countersunk head in the example shown. A screw driving recess is in the flat end 5 of the screw head 4 shown in the example which is used for turning the screw with a corresponding tool.

There is a screw thread 6 on the screw shaft 1 which is manufactured by means of rolls. This is a single-thread in the example shown. This thread 6 in the embodiment shown in FIG. 1 ranges up to the sharp tip 3 of the screw tip 2.

At the same time there is an opposite thread 7 in the front area which starts approximately at half the length of the conical form of the screw tip 2 and covers approximately three windings. This thread 7 forms a thread edge which is designed as and acts as a cutting edge. It can be seen in FIG. 1 and also in FIG. 2 that this opposite cutting thread shows the same thread pitch as the screw thread 6. Its thread height, i.e. the distance of its cutting edge from the surface of the screw shaft 1, is about half that of the thread height of the screw thread 6.

For the embodiment according to FIG. 2, the screw tip 2 is designed as a cutting tip 8, which is formed using a pinching process. It comprises two front cutting edges 9 which perform the actual drilling process and two lateral cutting edges 10 which are arranged in parallel to the longitudinal direction of the axis. There is also a cutting thread 7 present here between the screw thread 6 which in turn shows the same pitch as the screw thread but with a smaller thread height.

The invention claimed is:

1. A screw, comprising:
   a screw head,
   a screw shaft connected to the screw head,
   a screw tip at a front end of the screw opposite from the screw head, wherein the screw tip comprises a cutting tip with two front cutting edges and two lateral cutting edges,
   a screw thread winding around the screw shaft in one direction, the screw thread being configured such that turning the screw advances the screw in a material by engagement of the screw thread in the material,
   a cutting thread winding around the screw shaft in a direction opposite to the direction of the screw thread, the cutting thread being configured to cut into the material around the screw,
   wherein the cutting thread has a cutting edge that starts behind the cutting tip and extends only along a part of the screw, beyond which part of the screw only the screw thread surrounds the screw shaft, and
   wherein a thread pitch of the cutting thread is less than or equal to a thread pitch of the screw thread.

2. The screw according to claim 1, wherein the cutting thread extends along the screw shaft for two to three windings of the screw thread.

3. The screw according to claim 1, wherein the cutting thread has a thread height in a range between 0.2 mm and a thread height of the screw thread.

4. The screw according to claim 1, wherein the cutting thread has a thread height that remains constant from the front end of the screw toward the screw head.

5. The screw according to claim 1, wherein the thread pitch of the cutting thread is equal to the thread pitch of the screw thread.

6. The screw according to claim 1, wherein the screw thread and the cutting thread are single-threads.

7. The screw according to claim 1, wherein the screw thread is a chipboard thread.

8. The screw according to claim 1, wherein the screw thread is a wood thread.

* * * * *